(12) United States Patent
Kang

(10) Patent No.: US 6,644,692 B2
(45) Date of Patent: Nov. 11, 2003

(54) ANCHOR WITH AN IMPROVED UPPER STRUCTURE AND METHOD FOR MANUFACTURING THE SAME

(76) Inventor: Jin Hee Kang, 401 Munsung Villa, 465-7 Shinwal Dong, Yangcheon Ku, Seoul (KR)

( * ) Notice: Subject to any disclaimer, the term of this patent is extended or adjusted under 35 U.S.C. 154(b) by 0 days.

(21) Appl. No.: 09/955,065

(22) Filed: Sep. 19, 2001

(65) Prior Publication Data

US 2002/0190517 A1 Dec. 19, 2002

(30) Foreign Application Priority Data

Jun. 15, 2001 (KR) .................................. 10-2001-33764
Jun. 15, 2001 (KR) .................................. 10-2001-33766

(51) Int. Cl.[7] .............................................. B60R 22/24
(52) U.S. Cl. .................................. 280/801.1; 403/408.1
(58) Field of Search ........................... 280/801.1, 808; 403/408.1

(56) References Cited

U.S. PATENT DOCUMENTS

| 4,618,165 | A | * | 10/1986 | Seifert et al. | 280/808 |
|---|---|---|---|---|---|
| 5,411,292 | A | * | 5/1995 | Collins et al. | 280/806 |
| 5,513,880 | A | * | 5/1996 | Ohira et al. | 280/808 |
| 5,762,371 | A | * | 6/1998 | Noguchi | 280/801.2 |
| 5,762,373 | A | * | 6/1998 | Sugimoto | 280/808 |
| 6,007,100 | A | * | 12/1999 | Steffens, Jr. | 280/801.1 |
| 6,267,410 | B1 | * | 7/2001 | Koketsu et al. | 280/801.1 |
| 6,491,347 | B2 | * | 12/2002 | Iseki | 297/463.1 |
| 2002/0190518 | A1 | * | 12/2002 | Kang | 280/801.1 |

FOREIGN PATENT DOCUMENTS

| GB | 2255897 | A | * | 11/1992 |
|---|---|---|---|---|
| JP | 2002-220026 | | * | 1/2001 |

* cited by examiner

Primary Examiner—Paul N. Dickson
Assistant Examiner—George D. Spisich
(74) Attorney, Agent, or Firm—GWiPS

(57) ABSTRACT

A mini anchor with an improved upper structure comprises a lower part (1a) having a slot (2) for suspending the seatbelt and an upper part (1b) having a bolt-mounting sink (3) for directly mounting on a vehicle body. The bolt-mounting sink (3) has a cylindrical basin shape with predetermined depth. A bolt-hole (5) is formed on a bottom (4) center of bolt-mounting sink (3). The upper part of mini anchor is directly installed on the vehicle body with a proper clearance. This mini anchor is designed to delete a bushing being used in the conventional anchor assembly. Therefore, the overall assembly cost is remarkably reduced. Additionally, the workers are free from the worry of accidental omitting a bushing during the seatbelt assembly.

2 Claims, 21 Drawing Sheets

US 6,644,692 B2

ANCHOR WITH AN IMPROVED UPPER STRUCTURE AND METHOD FOR MANUFACTURING THE SAME

BACKGROUND OF THE INVENTION

1. Field of the Invention

The present invention relates to a mini anchor for installing a seatbelt device. More particularly, the structure of mini anchor is provided a proper clearance for directly mounting on a vehicle body instead of applying a busing used in a conventional assembly.

2. Description of the Related Art

Generally, a seatbelt is rolled up when it is not in use by the user, and it is unrolled from the rolled-up state when the user pulls the seatbelt to wear it.

FIG. 1 illustrates a typical seatbelt being mounted on an automobile seat. One end of connection belt (20) is mounted on one side of passenger seat (D) by an anchor (70). A buckle (10) is attached at the other end of connection belt (20). A retractor (30) is fixed at the lower part of passenger seat (D) or vehicle body (B). A pillar anchor (60) is fixed at the upper part of vehicle body (B) locating just above passenger's shoulder for suspending the seatbelt. The seatbelt (40) is rolled up and stored inside the retractor (30) as a reservoir. A coupler (50) is attached at the end of seatbelt (40) for coupling or uncoupling the buckle (10) depending on the passenger's intention. The seatbelt (40) is suspended through the pillar anchor (60) for easily operating by the passenger. At an end of auxiliary seatbelt, a secondary anchor (80) is mounted on the vehicle body (B) or passenger seat (D) at the opposite side from the first anchor (70).

FIGS. 2 and 3 disclose a conventional anchor being used for a seatbelt. The conventional anchor made of a steel plate (S) comprises a lower part (1a) and upper part (1b). A slot (2) is provided at the mid of lower part (1a) for suspending a seatbelt. A bolt hole (5) is formed at the center of upper part (1b). The belts (20, 40) are installed through the slot (2). A bolt (6) is installed through the bolt hole (5) of anchor. The anchor is mounted on the vehicle body (B) by means of bolt (6) and busing (7).

FIGS. 4 and 5 disclose a conventional pillar anchor as another example. Except the lower part, the conventional pillar anchor has a similar structure to that of conventional anchor as shown in FIGS. 2 and 3. This type anchor also applies the means of bolt (6) and busing (7) when the pillar anchor is mounted on the vehicle body (B).

As shown in FIGS. 2 to 5, the upper part (1b) of convention anchor must be apart a certain distance from a vehicle body (B) for properly operating the seatbelt. To do so, the conventional anchor adopts a bushing (7) to apart the upper part (1b) of anchor from the vehicle body (B). The conventional pillar anchor is also applying a bushing (7) during the assembly to maintain a certain clearance between the upper part (1b) of anchor and vehicle body (B). Then, the conventional anchors could be mounted on the vehicle body by means of a bolt (6).

Depending on the vehicle types, one or more bushings (7) are installed to adjust the clearance. Accordingly, the bolt (6) length would be varied depending on the number of installed bushings. When the number of installed bushings between the conventional anchor and vehicle body is increased, the mounted bolt must be lengthened. Thus, the bolt price would be increased.

Even worse, many assembly workers frequently forget to install the bushings (7) to provide a proper clearance during the assembly. Therefore, the seatbelt will be jammed easily during the operation. The malfunction of seatbelt operation would be a cause of potential danger.

SUMMARY OF THE INVENTION

The present invention has improved by considering and solving the problems of conventional anchors. The object of the present invention is to provide an anchor with an improved upper structure for providing a proper clearance between the upper part of anchor and vehicle body without adapting a bushing.

To achieve the above object, a new concept of mini anchor with an improved upper structure has developed. The mini anchor comprises a lower part having a slot for suspending the seatbelt and an upper part having a bolt-mounting sink. The upper part of mini anchor is formed a cylindrical basin with a predetermined depth.

According to the present invention, a process for manufacturing the mini anchor with an improved upper part is described as follows:

The manufacturing process comprises a first step, stamping process to form an initial conical shape (S3a) having a predetermined depth; a second step, pressing process is to round up a tip of initial conical shape (S3a) for forming a transition conical shape (S3b). A basin (S4a) of transition conical shape (S3b) has less depth than that of previous step; a third step, expanding process is to form a transition semi-spherical shape (S3c) by expanding radial direction. A basin (S4b) of transition semi-spherical shape (S3c) has less depth than that of previous step; a fourth step, pressing process is to form a cylindrical basin (S3d) having a final depth with flat bottom (S4c); and final step, punching process is to form a bolt hole (5) at the bottom center of cylindrical basin (S4c).

There are four alternative processes for manufacturing the mini anchor with an improved upper structure disclosed in this specification. The basic process of four alternative processes for manufacturing the mini anchor is similar to the process mentioned above.

One of four alternative processes for manufacturing the mini anchor illustrates that a first step, stamping process for forming an initial conical shape (S3a) is same as the process mentioned before except a piercing process (S6). A tip of initial conical shape (S3a) is simultaneously pierced while the steel plate (S) is forming the initial conical shape (S3a).

Since the rest of process are identical with the previous process mentioned above, the detailed descriptions are omitted here.

Another alternative process for manufacturing the mini anchor illustrates that second step of pressing process for forming a transition conical shape (S3b) is same as previous process mentioned above except a piercing process (S6). A tip of transition conical shape (S3b) is simultaneously pierced while the steel plate (S) is forming a transition conical shape (S3b).

Because the first and third to final steps are identical with the previous process mentioned above, the detailed descriptions are skipped here.

Still other process for manufacturing the mini anchor with an improved upper part is described that a first step, stamping process is to form an initial trapezoidal shape (S13a) having a predetermined depth. Second step, pressing process is to form a transition trapezoidal shape (S13b) by expanding the initial transition trapezoidal shape (S13a) to the radial direction. Third step, expanding process is to form a secondary transition trapezoidal shape (S13c) by expanding wider than that of previous step. Forth step, pressing process is to form a cylindrical basin shape (S13d) having a final depth with flat bottom surface. Final step, punching process is to punch out a bolt-hole (S5) for installing a bolt.

DETAILED DESCRIPTION OF THE PREFERRED EMBODIMENTS

A mini anchor with an improved upper structure of the present invention is disclosed in detail accompanying with the drawings.

Figure 1:
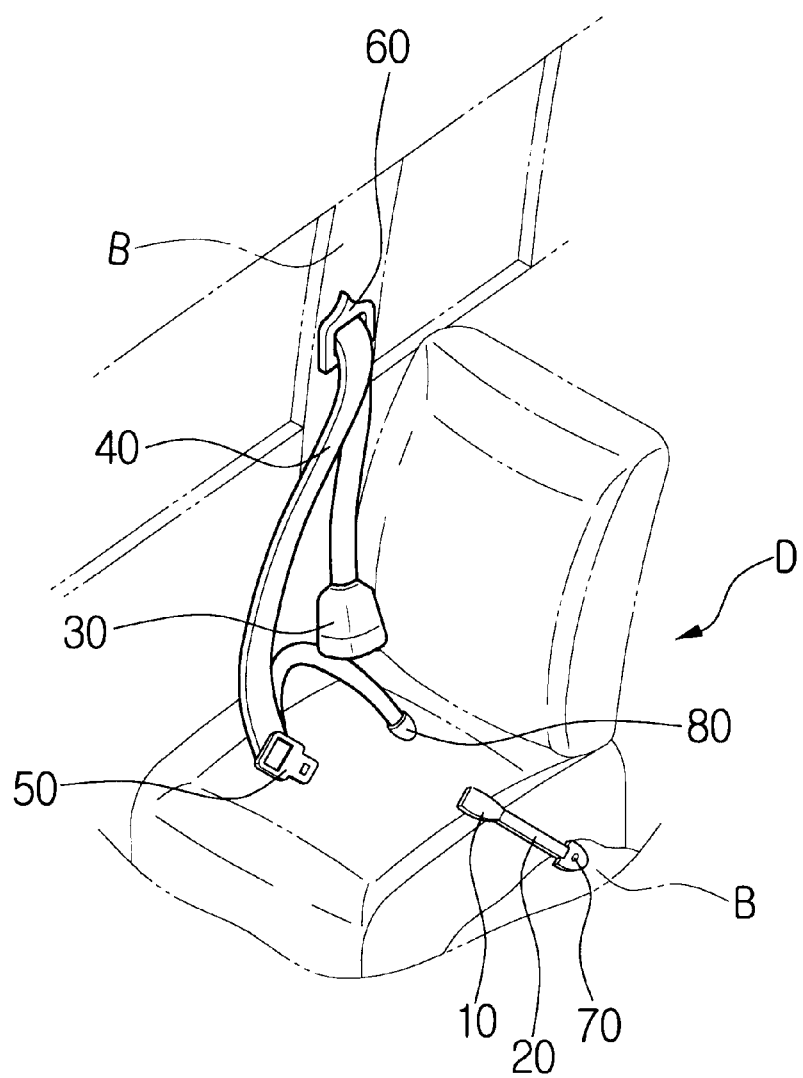
FIG. 1 is a schematic drawing of a seatbelt device for an automobile.
Figure 2:
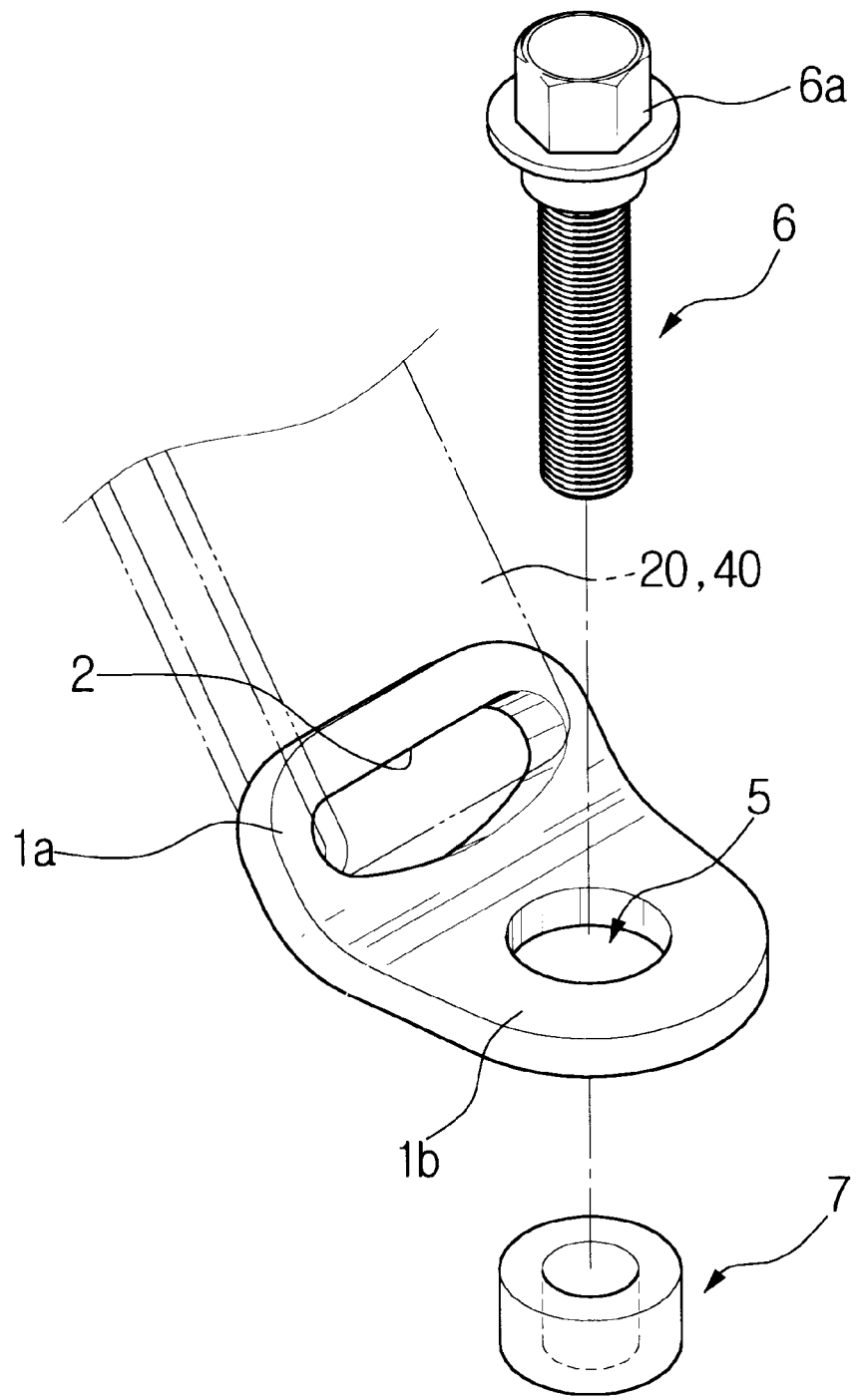
FIG. 2 is an exploded perspective view of conventional anchor being adapted a bushing.
Figure 3:
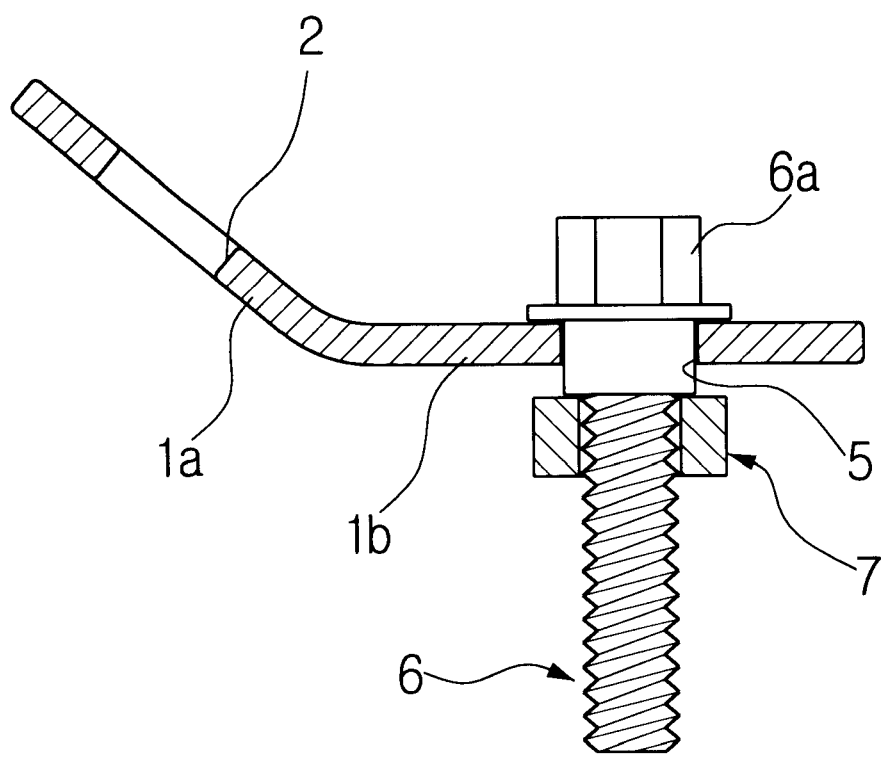
FIG. 3 is a sectional view of conventional anchor being adapted a bushing.
Figure 4:
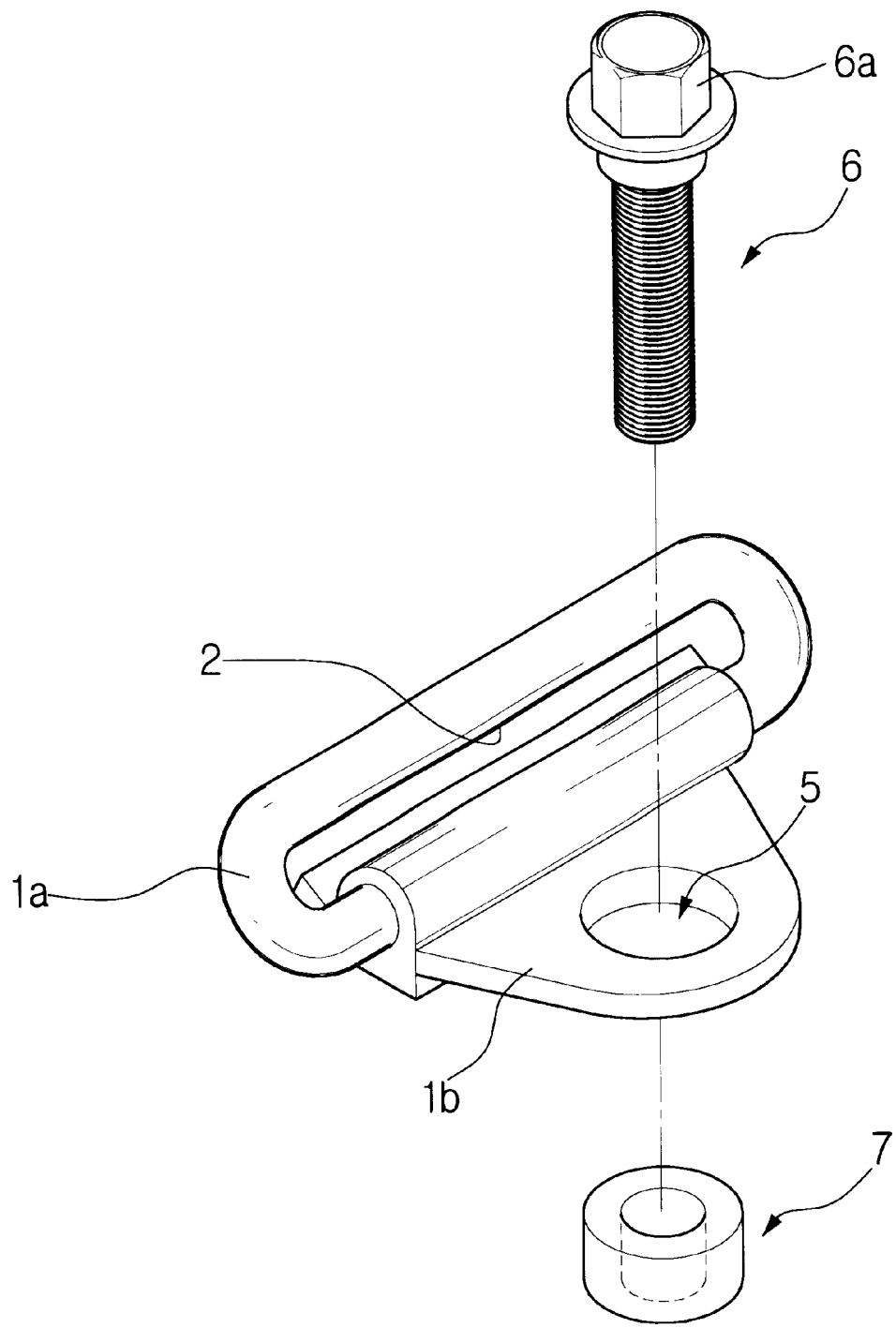
FIG. 4 is an exploded perspective view of conventional pillar anchor being adapted a bushing.
Figure 5:
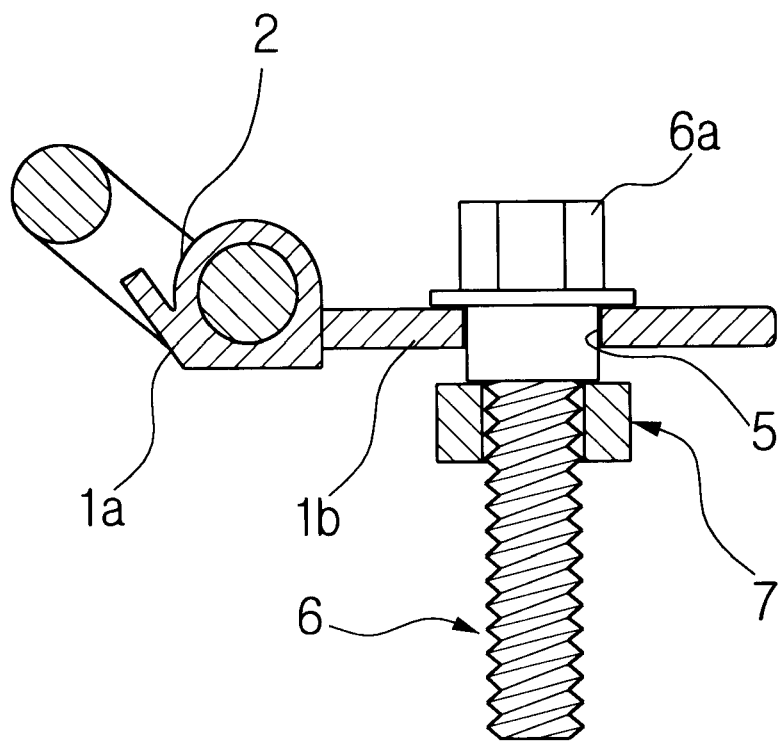
FIG. 5 is a sectional view of conventional pillar anchor being adapted a bushing.
Figure 6:
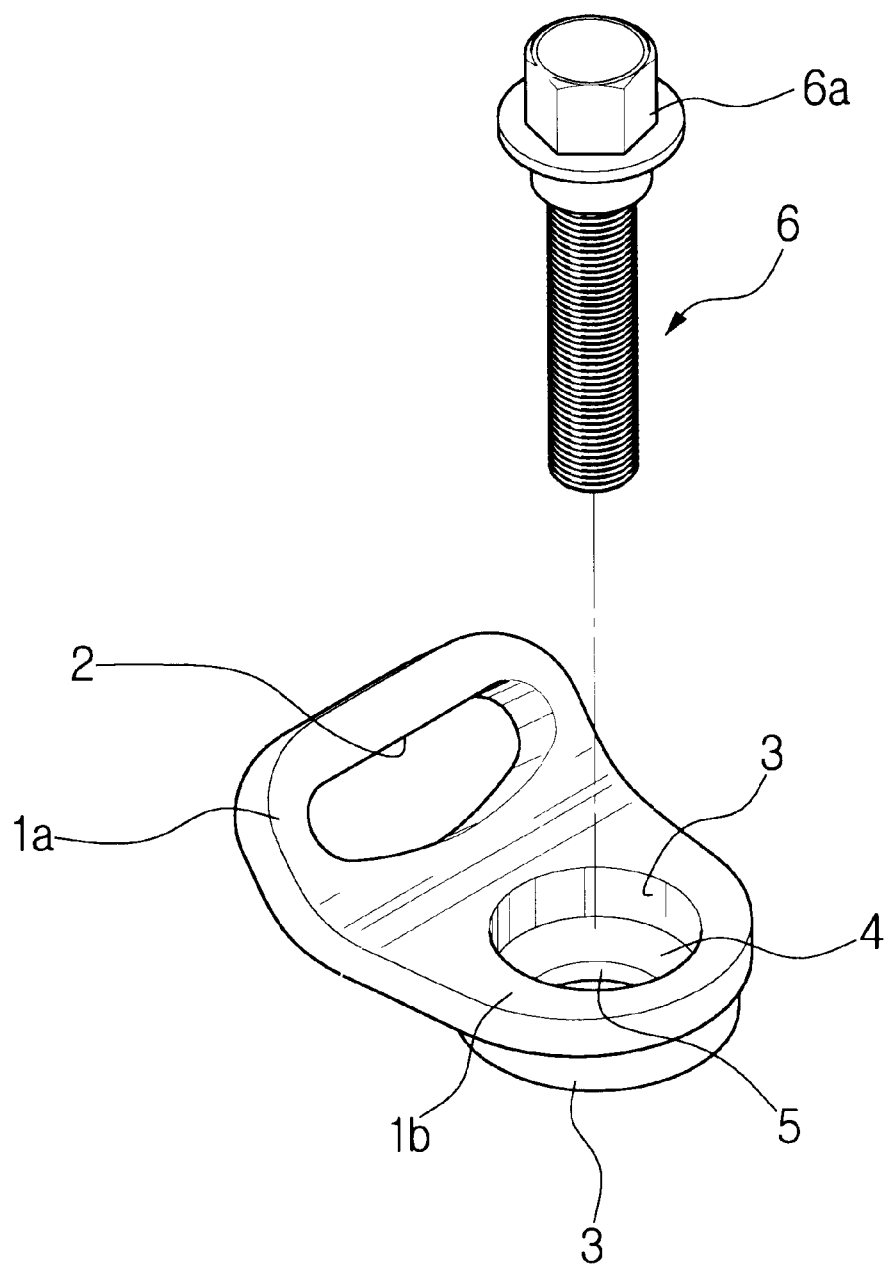
FIG. 6 is an exploded perspective view of mini anchor with an improved upper structure of the present invention.

As shown in FIG. 6, a mini anchor made of steel plate (S) comprises a lower part (1a) and an upper part (1b). The lower part (1a) provides a slot (2) for suspending a seatbelt. A bolt-mounting sink (3) having a cylindrical basin shape with a predetermined depth is formed on the upper part (1b). At the bottom center of bolt-mounting sink (3), a bolt hole (5) is formed for installing a bolt (6). There is abutted surface (4) at the bottom of bolt-mounting sink (3) for seating a head (6a) of bolt (6). A bolt (6) is installed through the bolt hole (5) for directly mounting the mini anchor on the vehicle body.

Figure 7:
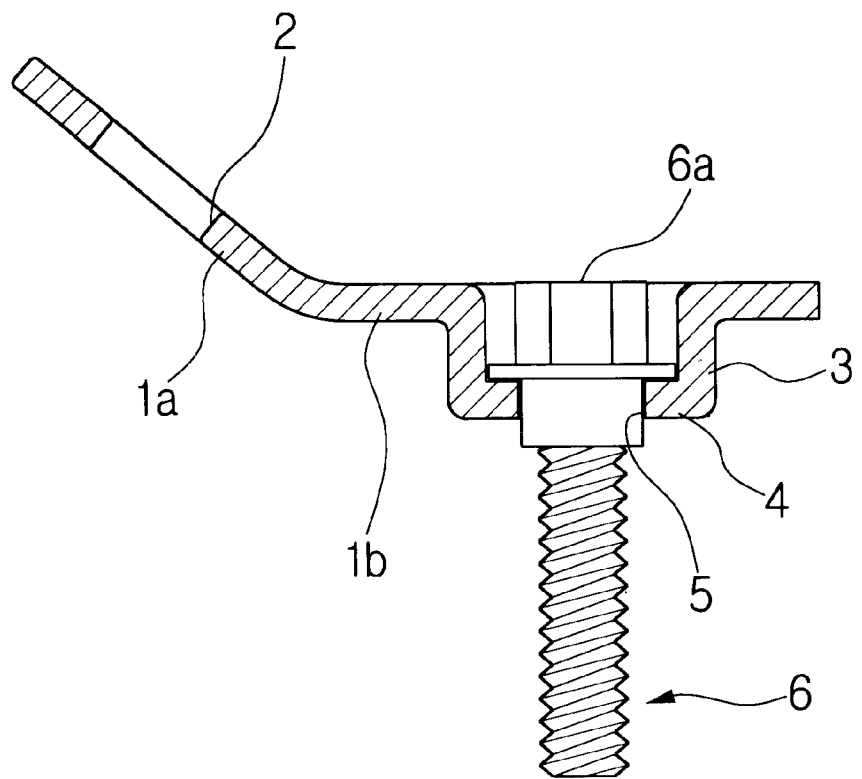
FIG. 7 is a sectional view of mini anchor with an improved upper structure of the present invention.

As depicted in FIG. 7, the head (6a) of bolt (6) is retained inside of bolt-mounting sink (3). The inner diameter of bolt-mounting sink (3) is little larger than the outer diameter of bolt turning tool so that the bolt is easily mounted on the vehicle body. The height of bolt head (6a) is same as the depth of bolt-mounting sink (3) for retaining the bolt head (6a) inside of cylindrical basin. The upper part (1b) of mini anchor is able to maintain a sufficient clearance from the vehicle body by the depth of bolt-mounting sink (3). Therefore, the upper part (1b) of mini anchor is located apart from the vehicle body without adapting a bushing used in the conventional seatbelt assembly.

An advantage of the present invention is that the mounted bolt (6) is possibly shortened since the head (6a) of bolt (6) is retained inside of the bolt-mounting sink (3). Thus, using shortened bolt (6) can be decreased the bolt price. Another advantage of the present invention is that a bushing is deleted from the seatbelt assembly. Consequently the overall seatbelt assembly cost is remarkably reduced. Other advantage is that the assembly workers are free from a worry of accidental omitting the bushings during the seatbelt assembly.

Figure 8:
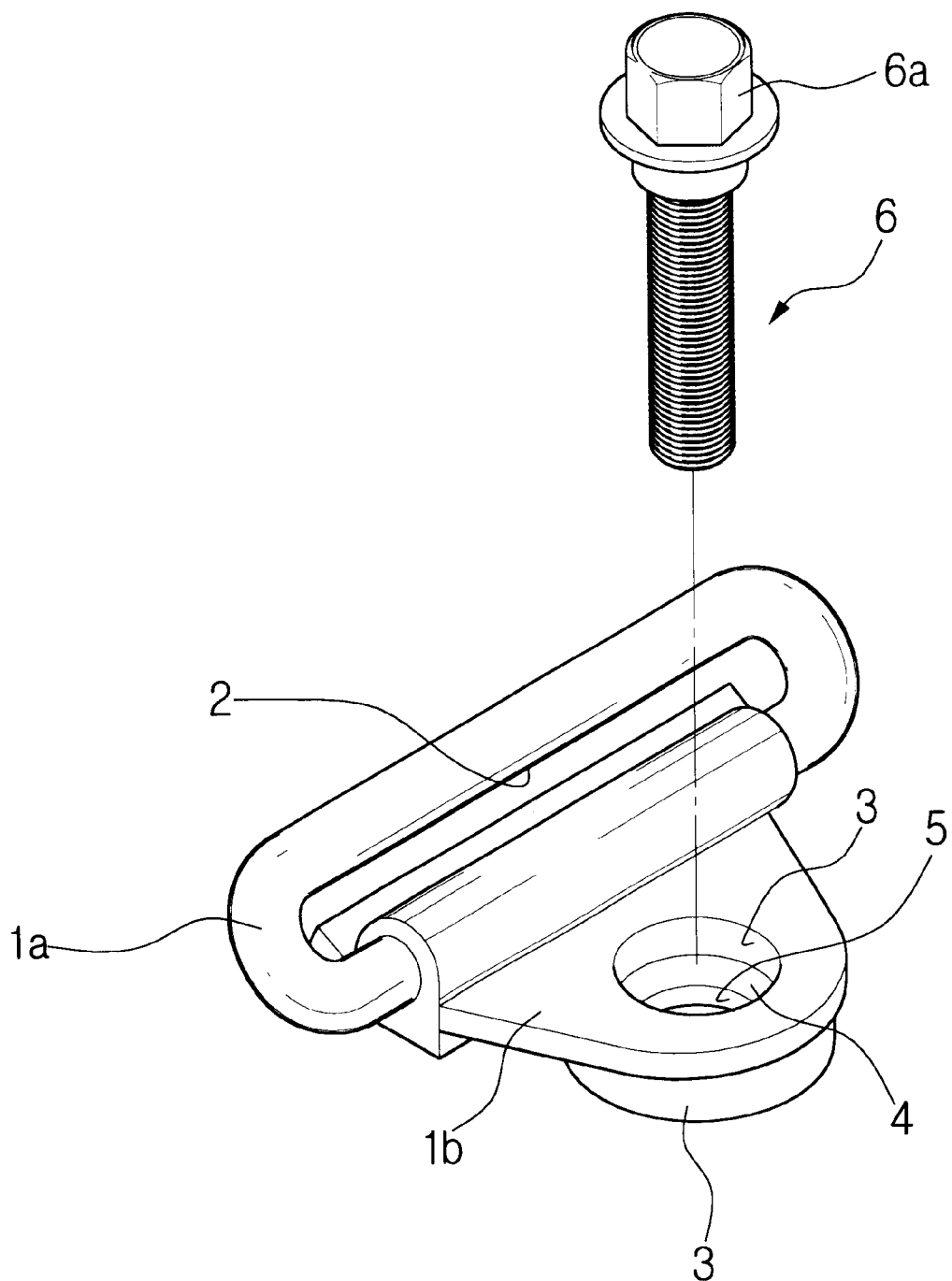
FIG. 8 is an exploded perspective view of pillar anchor with an improved upper structure of the present invention.
Figure 9:
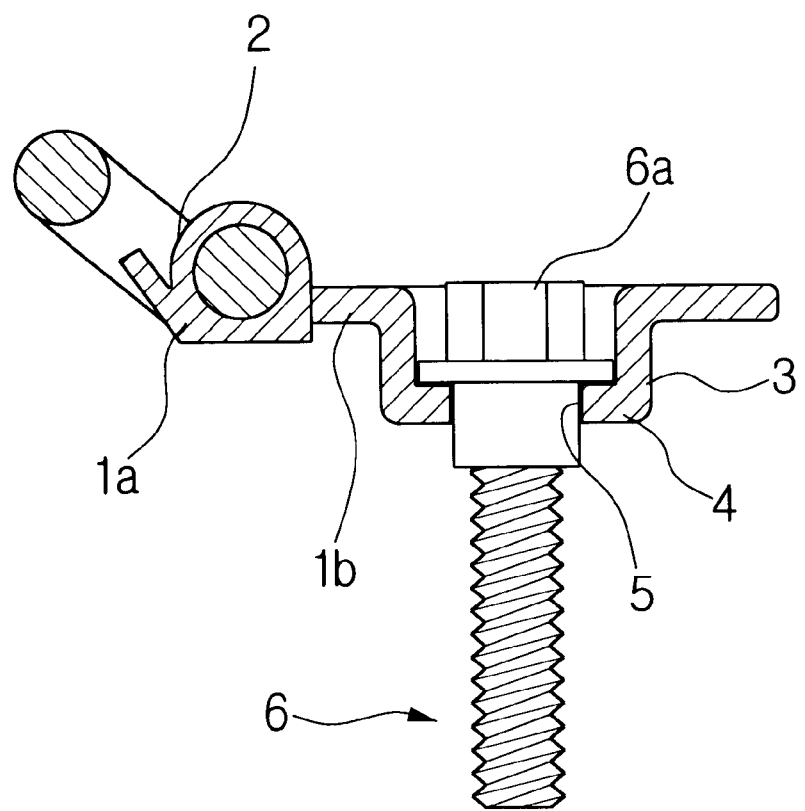
FIG. 9 is a sectional view of pillar anchor with an improved upper structure of the present invention.

FIGS. 8 and 9 show a pillar anchor with improved upper structure of the present invention. Except the lower part of pillar anchor, the upper part has identical structure with that of the mini anchor previously disclosed in FIGS. 6 and 7. Therefore, the detailed descriptions for the upper part of pillar anchor will be omitted here.

A process for manufacturing a mini anchor with an improved upper structure of the present invention is described in detail accompanying with the drawings.

Figure 10:
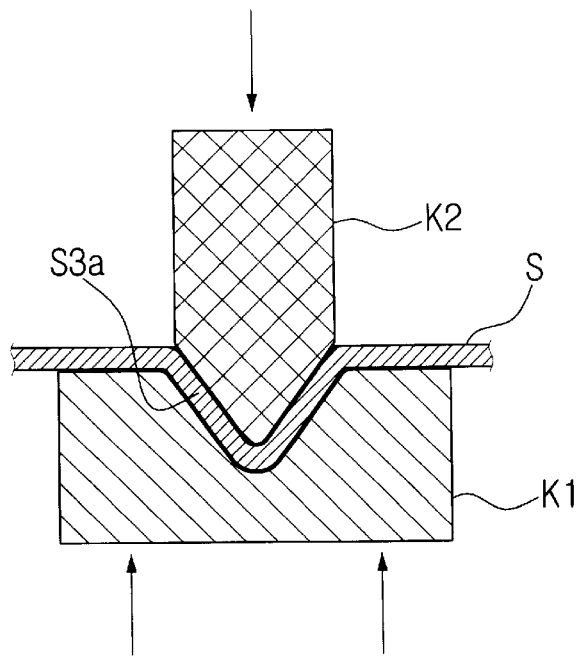
FIGS. 10 to 14 illustrate the process for manufacturing the mini anchor with an improved upper structure of the present invention.

Referring to FIGS. 10 to 14, a process for manufacturing a mini anchor with an improved upper structure is illustrated as follows:

A first step, stamping process shown in FIG. 10 is to form an initial conical shape (S3a) having a predetermined depth. The steel plate (S) is disposed between a stamping set of punch (K2) and die (K1) having a conical wedge shape and a conical notch shape, respectively.

Figure 11:
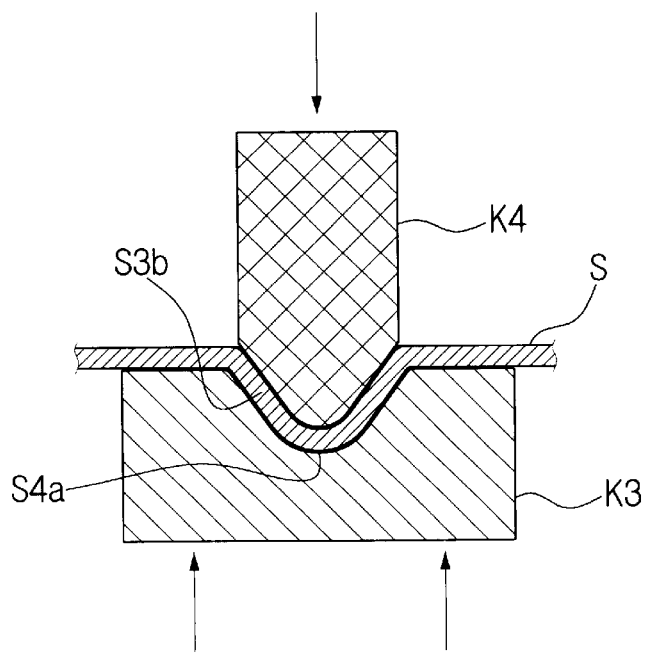

Second step, pressing process shown in FIG. 11 is to form a transition conical shape (S3b) by rounding a tip of initial conical shape (S3a). The pressing set of punch (K4) and die (K3) has relatively dull wedge shape and notch shape than that of previous step. Thus, a basin (S4a) of transition conical shape (S3b) is formed to be less depth than that of previous step by pressing the initial conical shape (S3a) to the radial direction.

Figure 12:
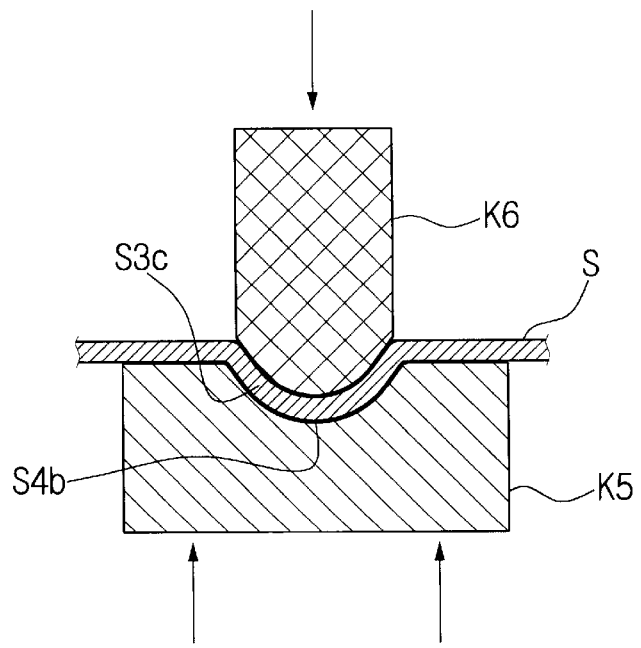

Third step, expanding process shown in FIG. 12 is to form a transition semi-spherical shape (S3c) by expanding the transition conical shape (S3b) to the radial directions. A expanding set of press punch (K6) and die (K5) has a semi-spherical wedge shape and concave shape, respectively. The basin (S4b) of transition semi-spherical shape (S3c) has relatively less depth and wider surface than that of previous step.

Figure 13:
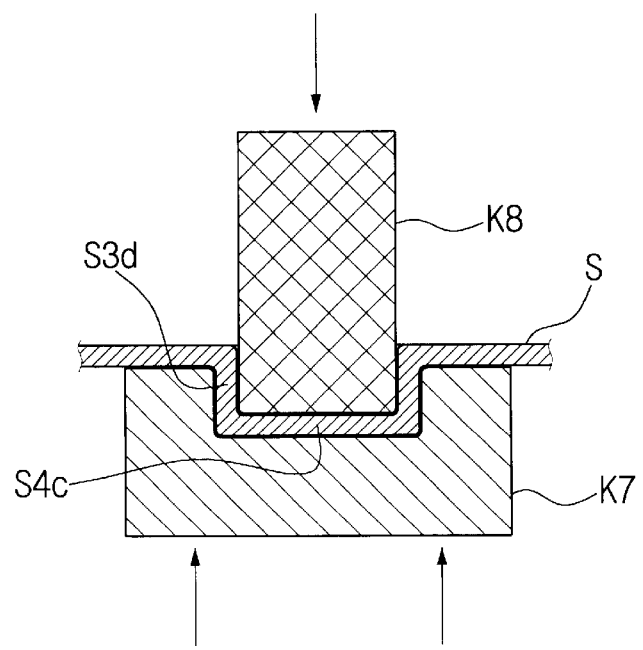

Forth step, pressing process shown in FIG. 13 is to simultaneously form a cylindrical basin (S3d) having a final depth and a flat bottom surface (S4c). The depth of cylindrical basin (S3d) is less than that of previous step. A pressing set of punch (K8) and die (K7) has cylindrical edge shape and cylindrical basin shape, respectively.

Figure 14:
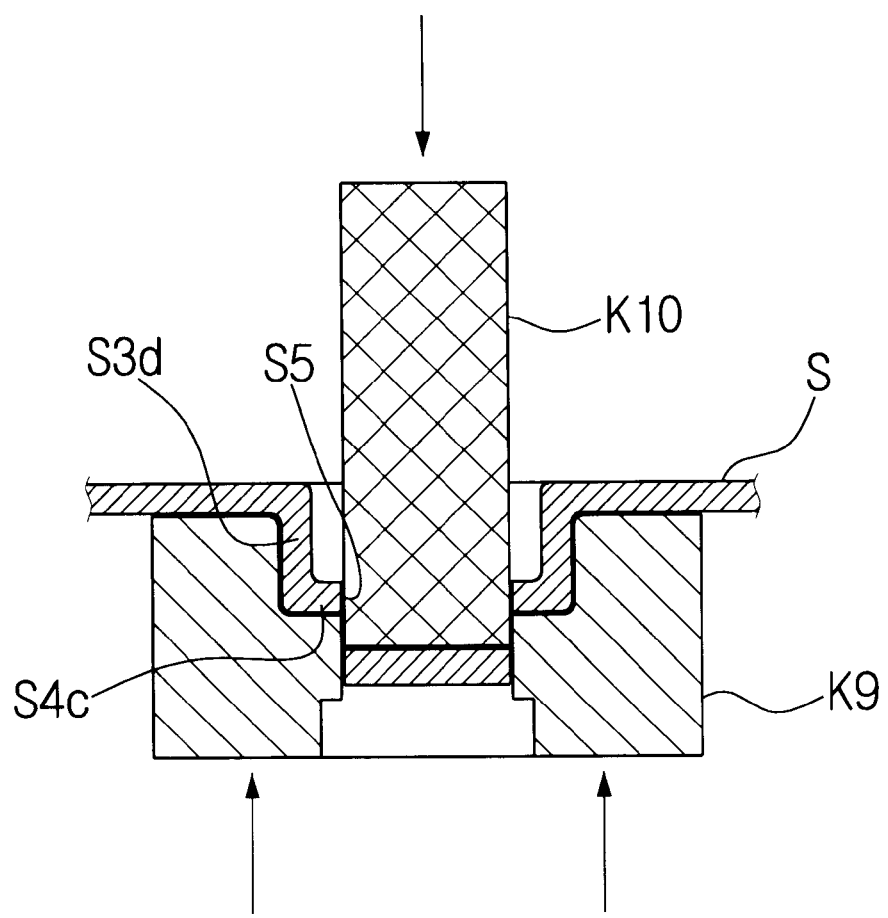

Final step, punching process shown in FIG. 14 is to punch out a bolt hole (S5) for installing a bolt by a punching set of punch (K10) and die (K9).

If the steel plate (S) is excessively pressed or expanded during the manufacturing process, the thickness of steel plate (S) is decreased too thin beyond an allowable limit. As a result, the product is default and tensile strength would be too weakened to use for a seatbelt. In order to prevent the excessive expansion, four alternative processes for manufacturing a mini anchor with an improved upper structure are introduced in the present specification. The basic process of alternative manufacturing processes is similar to that of process mentioned earlier in FIGS. 10 to 14.

An alternative process for manufacturing a mini anchor is illustrated in FIGS. 15 through 19 for maintaining a constant thickness of steel plate (S) during the manufacturing process.

Figure 15:
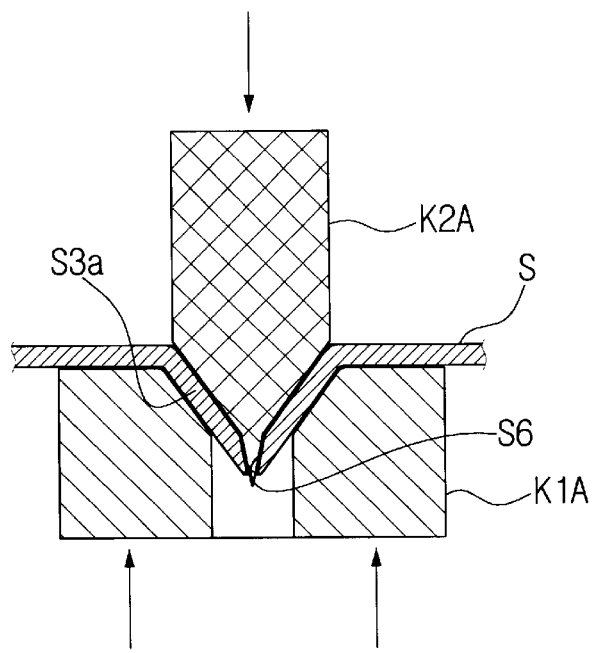
FIGS. 15 to 19 illustrate alternative process for manufacturing the mini anchor with an improved upper structure of the present invention.
Figure 16:
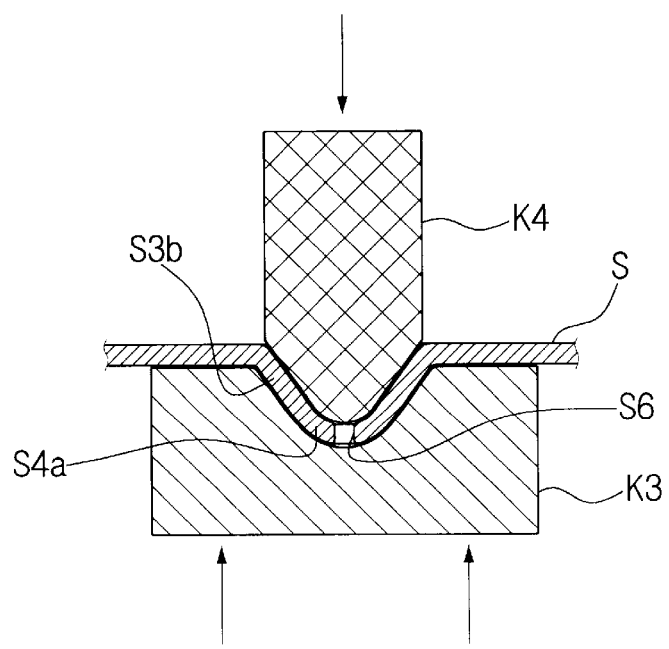
Figure 17:
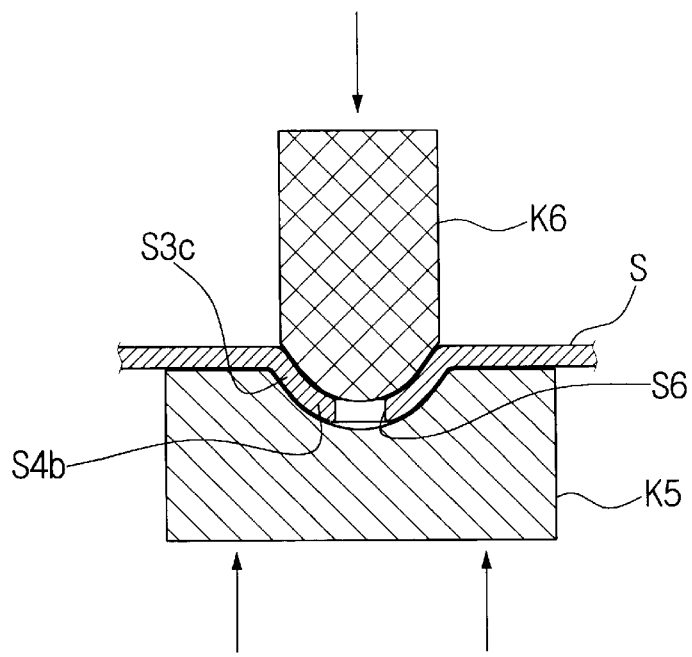
Figure 18:
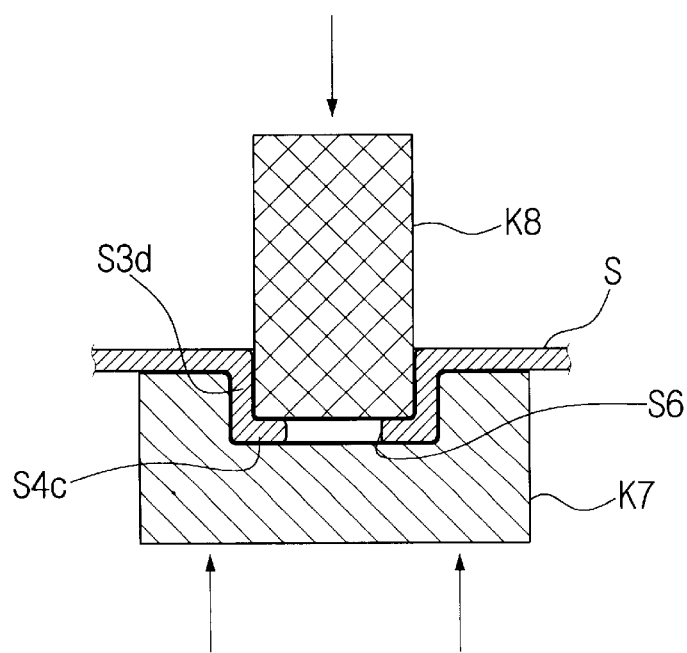
Figure 19:
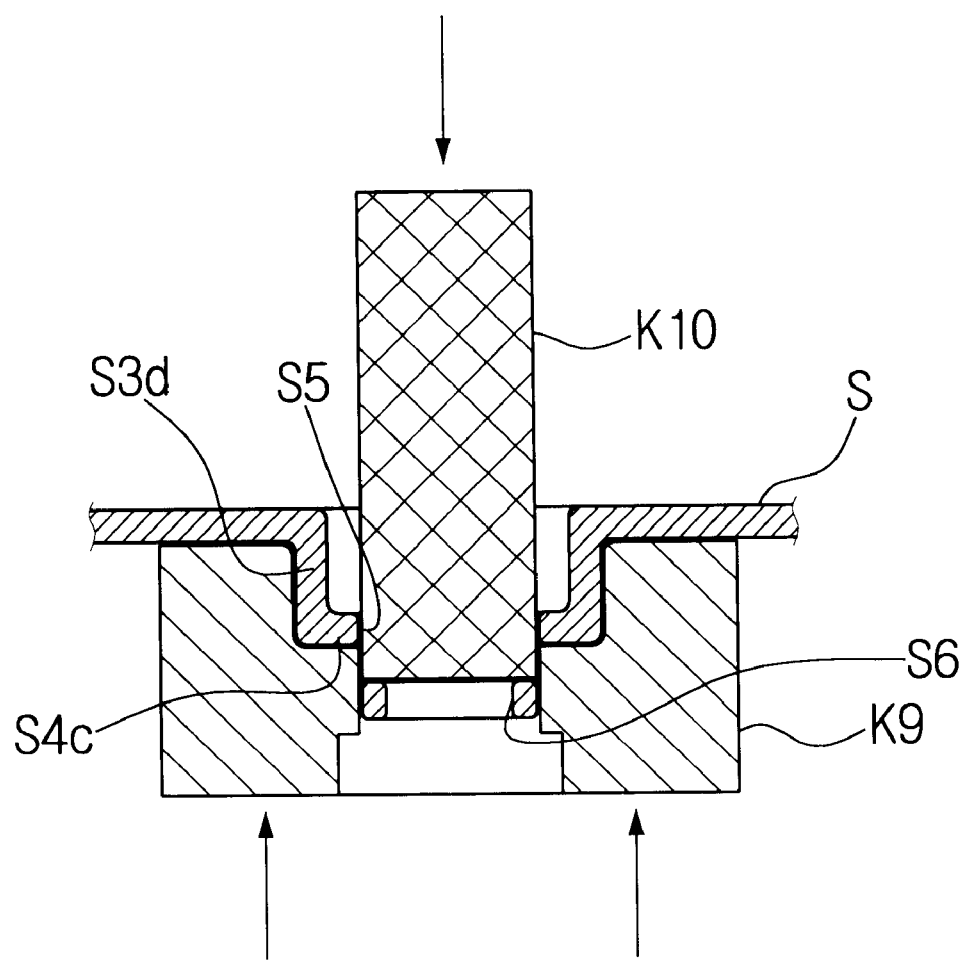
Figure 20:
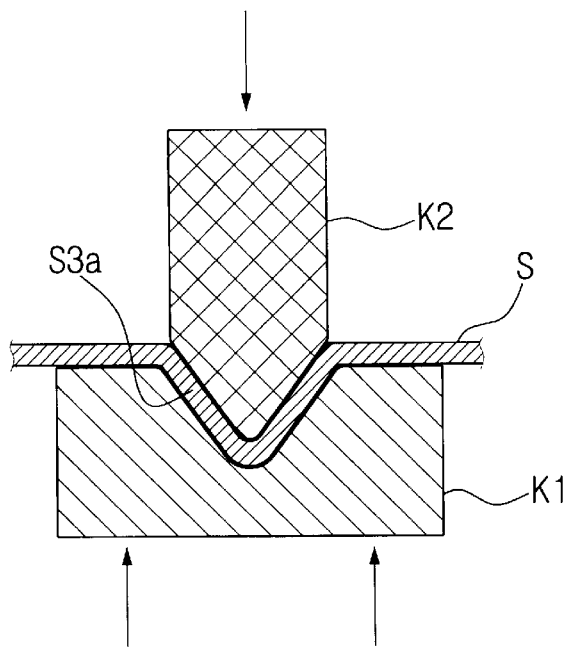
FIGS. 20 to 24 illustrate another alternative process for manufacturing the mini anchor with an improved upper structure of the present invention.

FIG. 15 shows a first step, stamping process for forming an initial conical shape (S3a) with a predetermined depth. The steel plate (S) is disposed between a stamping set of punch (K2A) having a sharp point wedge (S6) at a tip of conical punch (K2A) and die (K2) having a conical notch with hollow portion at the center. The tip of initial conical shape (S3a) is simultaneously pierced while the initial conical shape (S3a) is being formed.

Due to the pierced portion (S6) at the tip of initial conical shape (S3a), it will prevent distortion of product from excessive expanding during the manufacturing process. Thus, the product is able to maintain a constant thickness throughout the manufacturing process. As a result, the tensile strength of product is kept within an acceptable limit. The rest process shown in FIGS. 16 through 19 is identical with the previous process shown in FIGS. 11 to 14. Therefore, the detailed descriptions of rest process are skipped here.

Another alternative process for manufacturing a mini anchor with an improved upper structure is illustrated through FIGS. 20 to 24.

Figure 21:
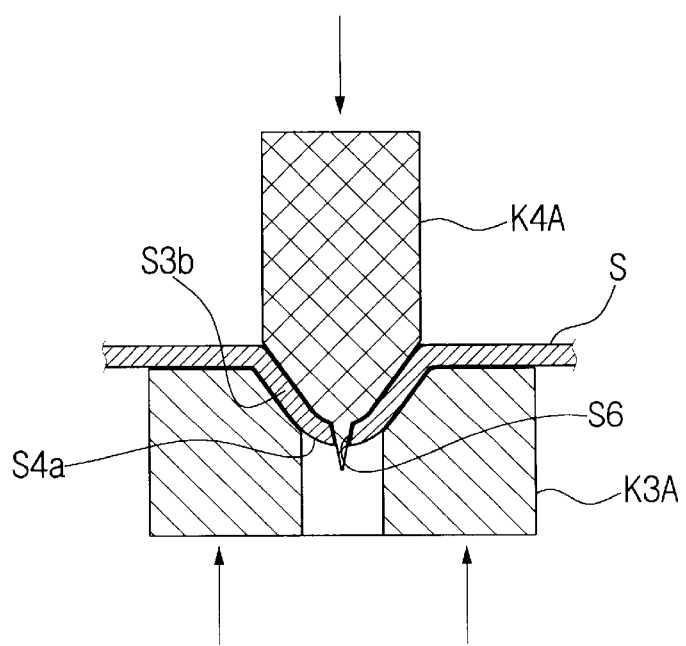

Except the second step shown in FIG. 21, the first, third to final steps are identical with the steps shown in FIGS. 10, 12 through 14.

Figure 22:
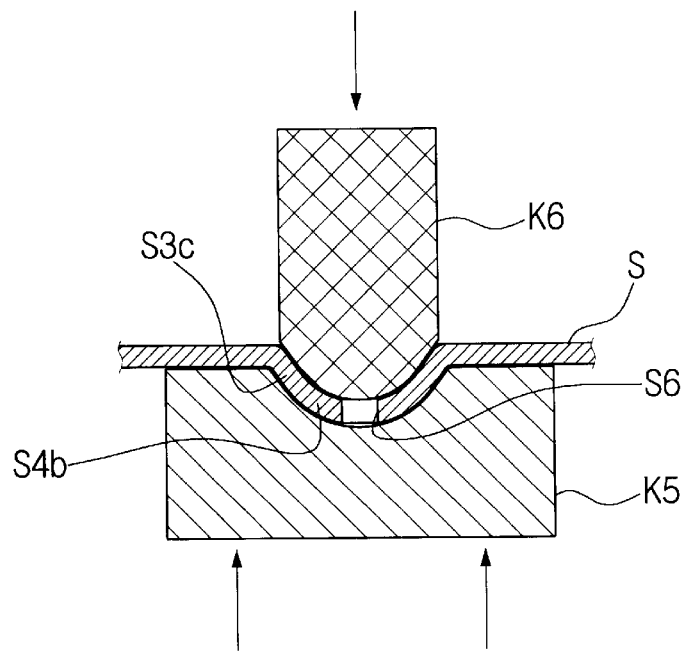
Figure 23:
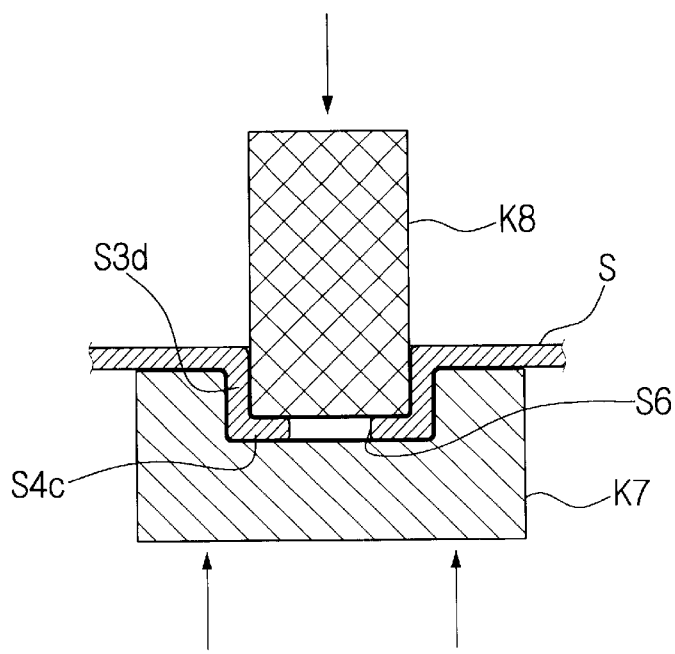
Figure 24:
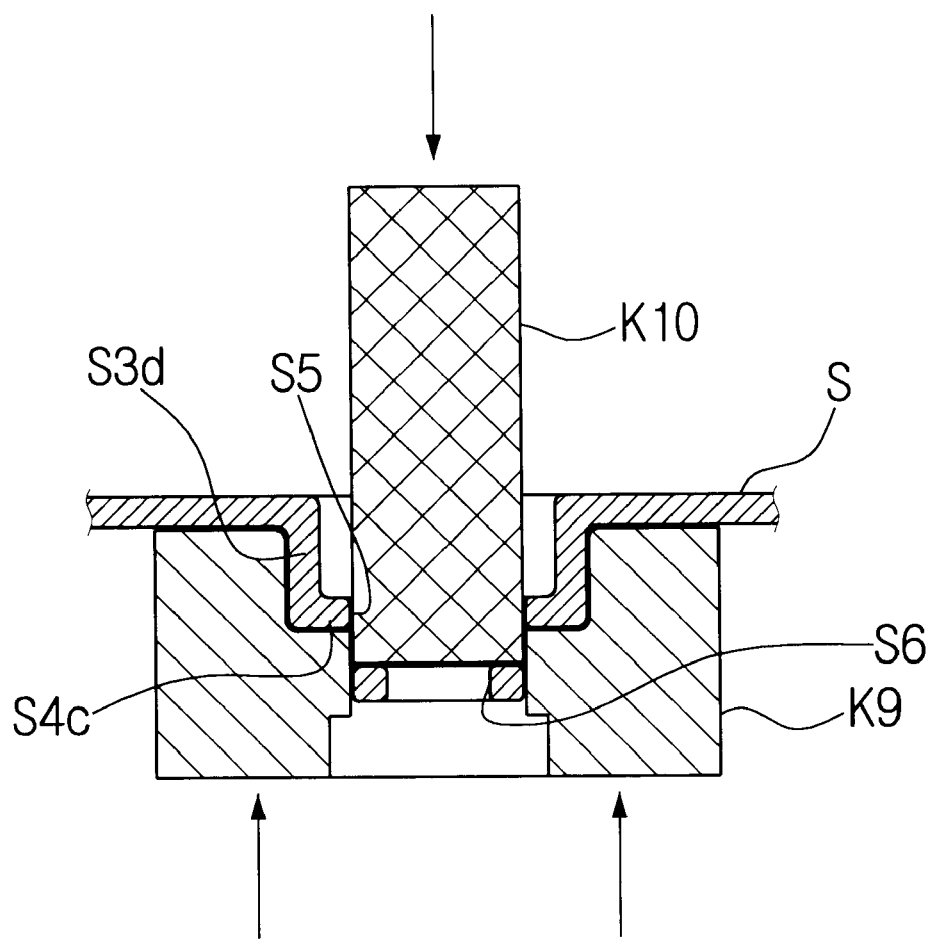

FIG. 21 shows a second step, pressing process to form a transition conical shape (S3b) by rounding the edge of initial conical shape (S3a). A pressing set has a punch (K4A) having relatively dull wedge shape with a sharp point (S6) and die (K3A) relatively dull notch shape with hollow portion at center. During the second step, the basin of transition conical shape (S3b) is simultaneously rounded up and pierced to have a hole. Due to a pierced portion (S6) formed at the tip of transition conical shape (S3b), it will prevent a distortion of product from excessive expanding during the manufacturing process. Therefore, the product is able to maintain a constant thickness throughout the manufacturing process. As a result, the tensile strength of product is maintained within an allowable limit. The rest process shown in FIGS. 22 through 24 are identical with the previous process shown in FIGS. 12 through 14. Therefore, the detailed descriptions of rest process are omitted here.

Figure 25:
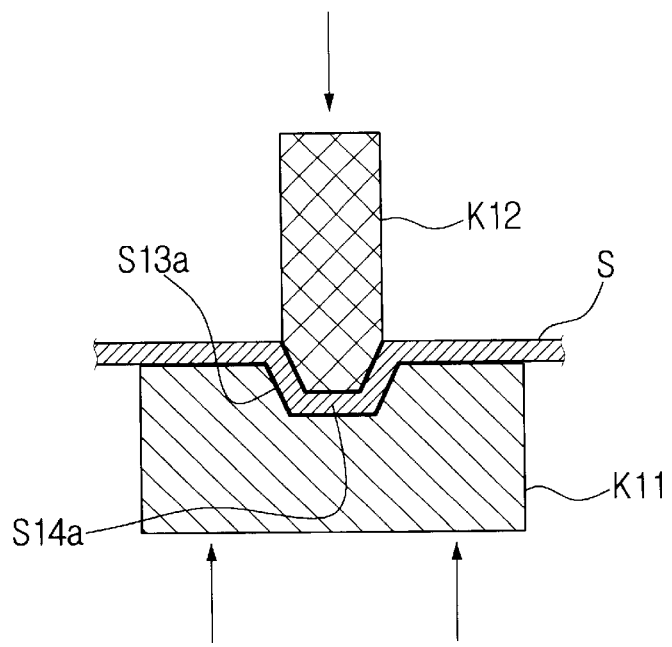
FIGS. 25 to 29 illustrate other alternative process for manufacturing the mini anchor with an improved upper structure of the present invention.

Still another alternative process of manufacturing a mini anchor with an improved upper structure is disclosed in FIGS. 25 through 24 as follows:

A first step, stamping process shown in FIG. 25 is to form an initial trapezoidal shape (S13a) having a predetermined depth. A steel plate (S) is disposed between a stamping set of punch (K12) having a trapezoidal wedge shape and die (K11) having a trapezoidal concave shape as a receptacle.

Figure 26:
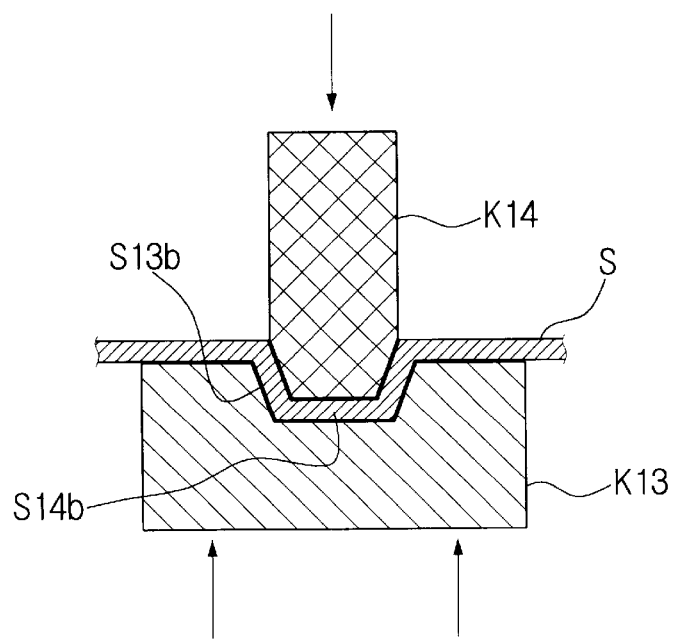

Second step, pressing process shown in FIG. 26 is to form a transition trapezoidal shape (S13b) by expanding the initial trapezoidal shape (S13a) to the radial direction. A pressing set of punch (K14) and die (K13) has relatively wider diameter and less tapered wedge and receptacle than that of previous step. A basin (S14b) of transition trapezoidal shape (S13b) is formed with less depth than that of previous step.

Figure 27:
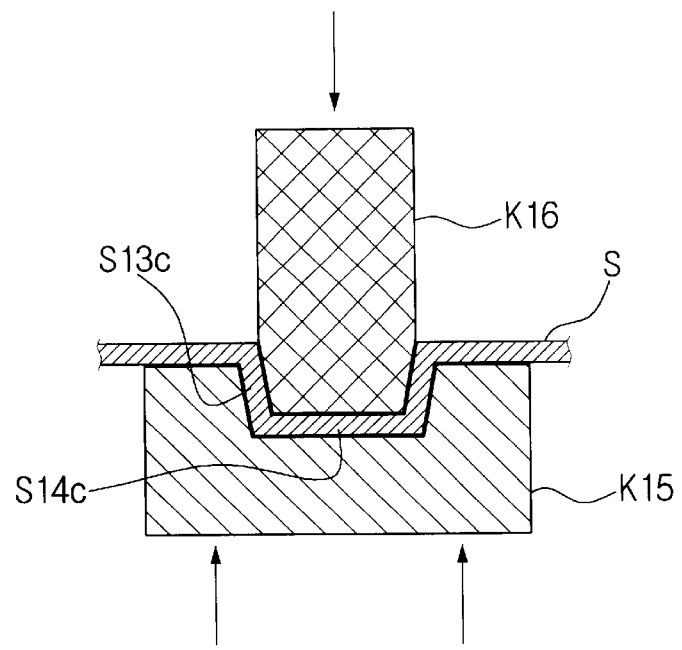

Third step, expanding process shown in FIG. 27 is to form a secondary transition trapezoidal shape (S13c) by further expanding the transition trapezoidal shape (S13b) to the radial directions. An expanding set of press punch (K16) and die (K15) has wider diameter and sharp tapered trapezoidal wedge and receptacle than that of previous step.

Figure 28:
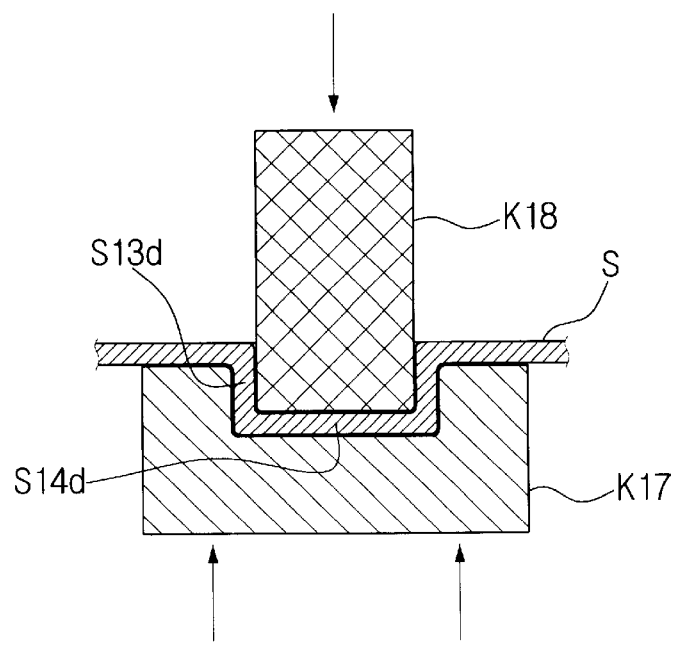

Forth step, pressing process shown in FIG. 28 is to simultaneously form a cylindrical basin (S13d) and flat bottom surface (S14d). A pressing set has a punch (K18) having cylindrical edge shape and die (K17) having cylindrical basin shape. The depth of cylindrical basin (S13d) is formed with less than that of previous step.

Figure 29:
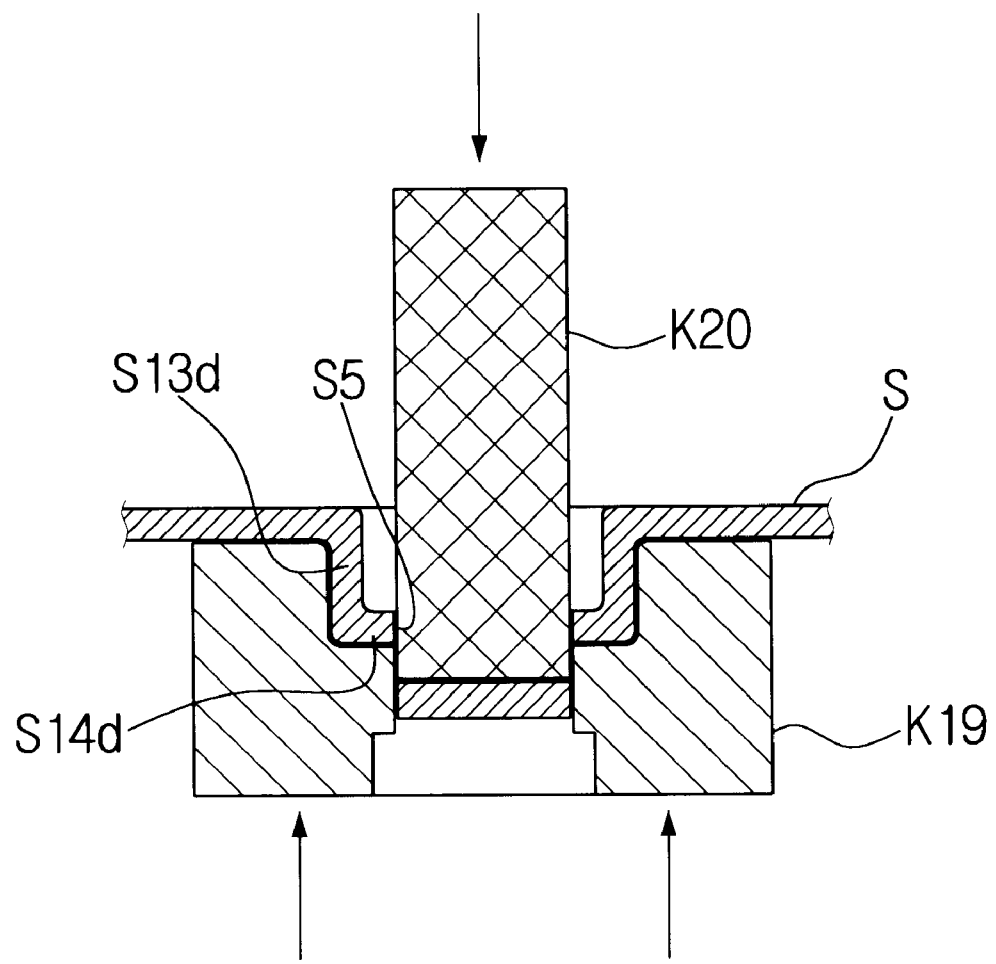

Final step, punching process shown in FIG. 29 is to punch out a bolt hole for installing a bolt by a punching set of die (K19) and punch (K20).

According to the present invention, the mini anchor with the improved upper part is provided a sufficient clearance between the vehicle body without applying a bushing used in the conventional assembly. Because the bolt head is retained inside of bolt-mounting sink, it is possibly reduce the bolt length. Consequently, the overall assembly cost for seatbelt would be remarkably reduced. The assembly worker is also free from worry of accidental omitting a bushing during the assembly.

While the present invention has been described in detail with its preferred embodiments, it will be understood that it further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. An anchor for directly mounting on a vehicle body and suspending a seatbelt (40) through thereon having a lower part (1a) and an upper part (1b) comprises:

a bolt-mounting sink (3) having a cylindrical basin shape with a predetermined depth from a surface of said upper part (1b), said predetermined depth is the same height as a bolt head (6a) for retaining said bolt head (6a) inside said bolt-mounting sink (3), a bolt-hole (5) being formed at a bottom (4) center of said bolt-mounting sink (3) with an abutted area for seating said bolt head (6a), and a clearance between said upper part (1b) of the anchor and said vehicle body is provided outside the cylindrical basin (3) for properly operating said seatbelt, said clearance is the same height as the height of the outside of the cylindrical basin (3).

2. The anchor of claim 1, wherein an inner diameter of bolt-mounting sink (3) is little larger than an outer diameter of a bolt head turning tool for mounting said bolt head (6a) inside of said bolt-mounting sink (3).

* * * * *